(12) United States Patent
Heitplatz et al.

(10) Patent No.: US 8,910,779 B2
(45) Date of Patent: Dec. 16, 2014

(54) CONVEYOR MEANS WITH CONCAVE BELT

(71) Applicant: Beumer GmbH & Co. KG, Beckum (DE)

(72) Inventors: Heino Heitplatz, Dreinsteinfurt (DE); Jan Josef Jesper, Marsberg (DE)

(73) Assignee: Beumer GmbH & Co. KG, Beckum (DE)

( * ) Notice: Subject to any disclaimer, the term of this patent is extended or adjusted under 35 U.S.C. 154(b) by 0 days.

(21) Appl. No.: 14/150,922

(22) Filed: Jan. 9, 2014

(65) Prior Publication Data

US 2014/0197009 A1 Jul. 17, 2014

(30) Foreign Application Priority Data

Jan. 11, 2013 (DE) .......................... 10 2013 000 372

(51) Int. Cl.
*B65G 15/60* (2006.01)
*B65G 15/08* (2006.01)
*B65G 15/62* (2006.01)

(52) U.S. Cl.
CPC ............... *B65G 15/08* (2013.01); *B65G 15/62* (2013.01)
USPC ........... 198/818; 198/300; 198/808; 198/820; 198/845

(58) Field of Classification Search
USPC ............... 198/300, 681, 715, 803.14, 803.15, 198/808, 818, 820, 845, 861.2
See application file for complete search history.

(56) References Cited

U.S. PATENT DOCUMENTS

| | | | | | |
|---|---|---|---|---|---|
| 3,682,294 | A | * | 8/1972 | Milek | 198/808 |
| 3,924,729 | A | * | 12/1975 | Flinth et al. | 177/16 |
| 4,185,736 | A | * | 1/1980 | Jonkers | 198/811 |
| 4,215,776 | A | * | 8/1980 | Esler | 198/823 |
| 4,558,779 | A | * | 12/1985 | Schmitt et al. | 198/626.3 |
| 4,605,116 | A | * | 8/1986 | Miller | 198/364 |
| 4,658,883 | A | * | 4/1987 | Hazelett et al. | 164/432 |
| 4,696,390 | A | * | 9/1987 | Curtis | 198/823 |
| 4,792,036 | A | * | 12/1988 | Heidelberg | 198/619 |
| 5,248,029 | A | * | 9/1993 | Valcalda | 198/808 |
| 5,341,920 | A | * | 8/1994 | Riffe | 198/825 |
| 5,688,542 | A | * | 11/1997 | Tortosa | 426/36 |
| 5,722,528 | A | * | 3/1998 | Dolan | 198/499 |
| 6,119,589 | A | * | 9/2000 | Hain et al. | 99/460 |
| 6,874,615 | B2 | * | 4/2005 | Fallas | 198/459.8 |
| 7,490,932 | B2 | * | 2/2009 | Joppen | 347/103 |
| 7,527,144 | B2 | * | 5/2009 | Ostman | 198/823 |
| 7,641,045 | B2 | * | 1/2010 | Ishikawa et al. | 198/867.15 |
| 7,762,387 | B2 | * | 7/2010 | Dunn | 198/823 |
| 8,443,720 | B2 | * | 5/2013 | Takai et al. | 99/458 |

* cited by examiner

*Primary Examiner* — Douglas Hess

(74) *Attorney, Agent, or Firm* — Renner, Otto, Boisselle & Sklar, LLP

(57) ABSTRACT

A conveyor device with an elastic load-bearing means guided between a drive and a return roller which are spaced apart parallel to and opposite one another, wherein the load-bearing means circulates endlessly in a carrying run and a lower run, is flexible in all directions and is configured to receive articles to be conveyed, and which can be driven in a conveying direction by drive trains disposed on longitudinal edges of the load-bearing means, characterised in that a support means for the carrying run is located between the carrying run and the lower run, wherein the drive trains are stretched to a greater extent than a region of the load-bearing means located between them.

14 Claims, 14 Drawing Sheets

Fig. 1i

Detail AA

Detail F          Detail G

Fig. 2e

Detail I          Detail J

CONVEYOR MEANS WITH CONCAVE BELT

CROSS-REFERENCE TO RELATED APPLICATION

The present application claims priority under 35 U.S.C. 119 to German Application No. 102013000372.5, filed 11 Jan. 2013, the entirety of which is incorporated herein by reference.

TECHNICAL FIELD

The invention relates to a conveyor means with a load-bearing means guided between two drive and return rollers which are spaced apart parallel to and opposite one another, wherein the load-bearing means circulates endlessly in a carrying run and a lower run, is flexible in all directions and is configured to receive articles to be conveyed, especially load items, and which can be driven in a conveying direction by means of drive trains disposed on longitudinal edges of the load-bearing means.

BACKGROUND

A conveyor means of this kind is known from EP 1 897 824 B1, for example, the load-bearing means there consisting of a chain conveyor which is flexible in its circulating direction and is rigid transversely thereto, in the manner of a plate conveyor. Since the load-bearing means formed by the chain conveyor is only flexible in one direction, however, but is rigid in the direction orthogonal thereto, in operation it is only possible for a one-dimensional curvature to form, so that in situations in which acceleration forces act on an item lying on the load-bearing means in a direction in which the load-bearing means is not curved, there is a risk that the item might slide off the load-bearing means.

SUMMARY

The invention sets out to solve the problem of advancing a conveyor means of the generic kind such that, while keeping the construction as simple as possible, a two-dimensional curvature and support for the flexible load-bearing means from below can be achieved, wherein the curvature corresponds to a trough-like deformation of the load-bearing means, so that there is no longer any risk that an item might unintentionally slide or roll laterally off the load-bearing means.

This problem is solved in accordance with the invention in a conveyor means of the generic kind by the step of locating a support means for the carrying run between the carrying run and the lower run. The support means can be given a concave shape when seen in the direction of the carrying run.

It may be contemplated that the support means is curved one-dimensionally and has a linear deepest region between and parallel to the drive and return rollers, especially centrally between them. A one-dimensional curvature of this kind means a curvature in a direction transverse to the axes of rotation of the drive and return rollers, or running in the conveying direction, whereas the support means runs in a straight line when seen transversely to the conveying direction.

Alternatively, it may be contemplated that the support means is curved two-dimensionally and in particular has a trough shape and a deepest region over a certain area or at a point between the drive and return rollers, especially centrally between them, and between the longitudinal edges of the load-bearing means, especially centrally between them.

It may be contemplated that the support means has one or two supporting region(s) adjacent to one or both drive and return roller(s) of the load-bearing means.

It is also possible that the support means has one or two supporting edge region(s) adjacent to one or both longitudinal edges of the load-bearing means.

It is possible that in the unloaded state, when not holding any articles to be conveyed, the load-bearing means does not touch the support means, or that in the unloaded state, some regions of the load-bearing means rest on the support means, wherein, apart from the biasing of the load-bearing means, the weight of the load-bearing means itself and the position of the support means relative to the drive and return rollers determined by the design and its distance from the unloaded load-bearing means (carrying run)—i.e. when it is only weighed down by its own weight—plays a role.

The drive trains may be formed solely by longitudinal edge portions of the load-bearing means—which may, for example, be belt-shaped—, each of which may have a width of, for example, 2%, 5%, 10%, 20% or 25% of a width of the load-bearing means, or alternatively by longitudinal edge portions in combination with members additionally fixed on longitudinal edges of the load-bearing means, such as V-belts or toothed belts. Members of this kind preferably possess greater elasticity than the load-bearing means, so that the elasticity of the longitudinal edge portions of the load-bearing means is only slightly reduced. The drive trains may have an elasticity that is the same as or less than the elasticity of the load-bearing means. The drive trains may be guided between the drive and return rollers with a predetermined or adjustable biasing force when the load-bearing means is in a state in which the only load to which it is subject is its own weight.

As explained, it is possible for the drive trains to be slightly less expandable than the load-bearing means, so that even in a loaded state, when an item is resting on the load-bearing means, they do not sag very much, whereas the load-bearing means, depending on the weight of the item, exhibits a distinct sag and may rest partially, largely or completely on the support means. It is convenient for a greatest sag of the load-bearing means (distance from an ideally load-free flat run between the return and drive rollers) at a lowest point of the load-bearing means between the drive trains to be greater than a greatest sag of the drive trains themselves, both in both the unloaded and loaded states.

The drive trains and the load-bearing means can preferably be stretched to different degrees. The drive trains are stretched to a greater extent than a region of the load-bearing means located between them in order to achieve a sufficient biasing force to transfer the drive forces required. In this case, the load-bearing means is driven with or without less stretch than the drive trains. Since the load-bearing means is stretched less than the drive trains, while having the same or greater elasticity compared to the elasticity of the drive trains, a trough in the load-bearing means in a central region between the drive trains is enabled to form simply under its own weight. Even in this unloaded state, the load-bearing means can still rest on the support means. Because of the additional load imposed by goods being conveyed, the sag of the load-bearing means is further increased, and the load-bearing means rests on the support means with at least a minimum weight of a load item when subjected to a load.

Support members may be disposed vertically adjacent to the longitudinal edges of the load-bearing means to support the drive trains, which may be spaced apart vertically from the drive trains in the unloaded state of the load-bearing means.

These support members may be disposed at a slight distance from a position of the drive trains in the unloaded state in order to limit a sag of the drive trains to low amounts, such as to 1%, 2%, 3%, 4% or 5% of the distance of the axes of rotation of the drive and return rollers from one another.

A lower support means may be disposed beneath the lower run in order to limit the sag of the lower run or to eliminate it altogether, thus facilitating the formation of a sag or a concave or trough-like shape of the carrying run.

It is preferably contemplated that the drive trains are formed by V-belts or toothed belts fixed on the inside to the longitudinal edges of the load-bearing means. In particular, the invention also contemplates that the load-bearing means has a greater deflection radius on at least one of the drive and return rollers in the region of the drive trains than in a region located between them.

The invention further relates to a vehicle with a conveyor means in accordance with the invention, wherein a conveying direction of the conveyor means is transverse to a direction of travel of the vehicle. The vehicle may be configured, for example, as a car of a load item conveyor which is connected mechanically or by means of a suitable control to further vehicles of the same kind, such as in the form of a train-like arrangement in a conveyor for load items or a sorting conveyor. The vehicle or a car of this kind can be steered or rail-mounted. A vehicle of this kind can also be used in the context of a driverless transport system, especially with automatic control.

BRIEF DESCRIPTION OF THE DRAWINGS

The invention will now be explained by describing worked embodiments, reference being made to a drawing, in which FIG. 1 shows a first embodiment, wherein

FIG. 2 shows a second embodiment, with FIGS. 2a-h showing corresponding views to those in FIG. 1, FIG. 3 shows a third embodiment, with FIGS. 3a-h showing corresponding views to those in FIG. 1, FIG. 7 shows a seventh embodiment, with FIGS. 7a-h showing corresponding views to those in FIGS. 1a-h.

DETAILED DESCRIPTION

FIG. 1 shows a first embodiment of a conveyor means according to the invention in a plan view, various side and section views, and in two perspective views. The conveyor means consists substantially of two drive and return rollers 2, 4, which are parallel to and face one another and are spaced apart, and which are rotatable about axes of rotation 2a, 4a, and at least one of which (in this case the drive roller 4) is driven and is guided so as to circulate endlessly about the one load-bearing means in the form of a flexible conveyor belt 6.

The conveyor belt 6 is provided on the inside, at each of its outer longitudinal edges 6a, 6b with a toothed belt 8a, 8b, which is firmly joined to the conveyor belt, for example by bonding or vulcanising, and, together with the longitudinal edge portion to which it is joined, forms a drive train 8a, b. The purpose of the drive trains is to transmit a driving force from the drive roller 4 to the conveyor belt 6.

Figure 1A:
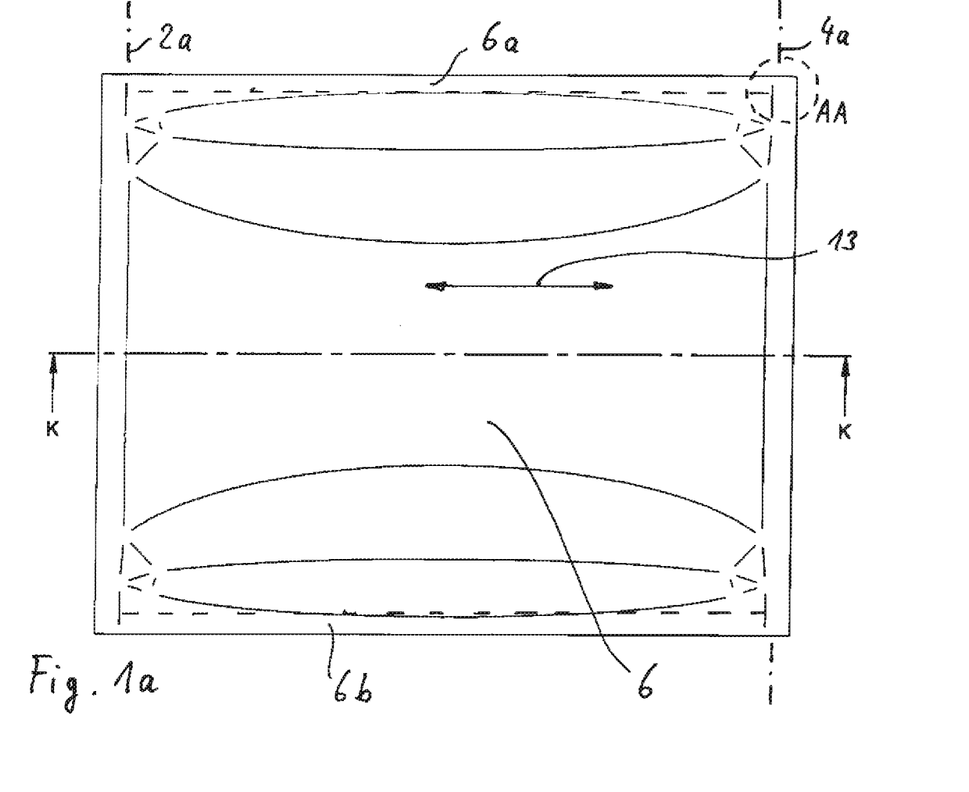
FIG. 1a shows a plan view.
Figure 1B:
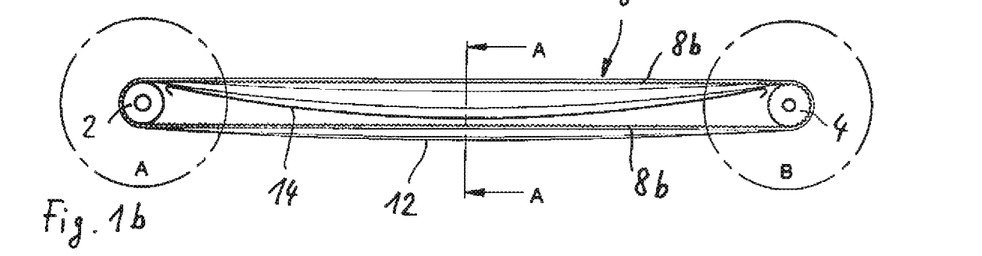
FIG. 1b shows a side view.
Figure 1C:
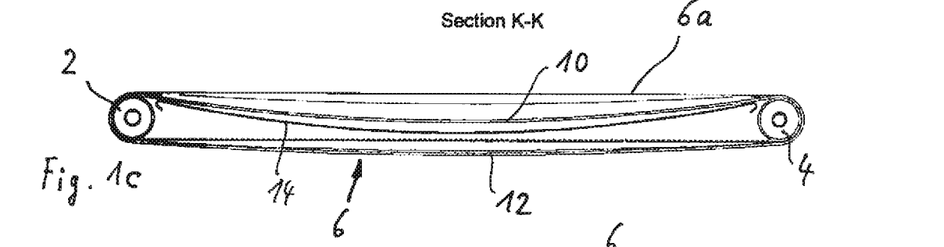
FIG. 1c shows a section view K-K in FIG. 1a, FIG. 1d shows a section view A-A in FIG. 1b.
Figure 1D:
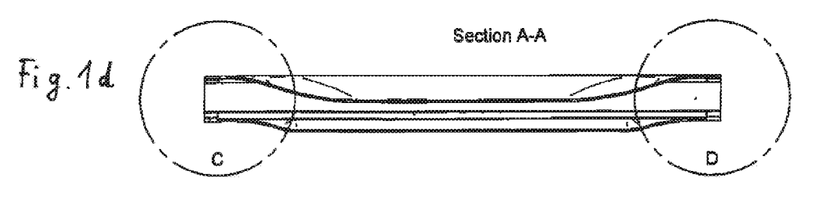
Figure 1E:
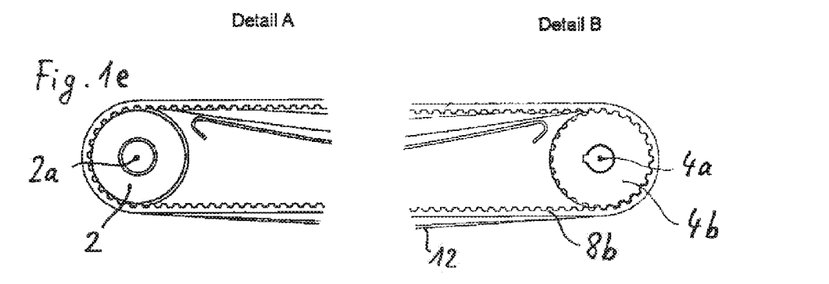
FIG. 1e shows details from FIG. 1b.

In the embodiment illustrated, there are disposed on the ends of the drive roller 4 sprockets 4b which engage with the toothed belt 8a, b in a positive fit (FIG. 1e). The return roller 2 is smooth on the outside. The diameter of the return roller 2 at its lateral end portions in the region of the drive trains or the toothed belt can differ from the diameter of the middle portion of the return roller 2 and in particular can be greater. The same applies to the diameter of the sprockets, which can be greater than the middle portion of the drive roller 4 located between the sprockets.

Figure 1F:
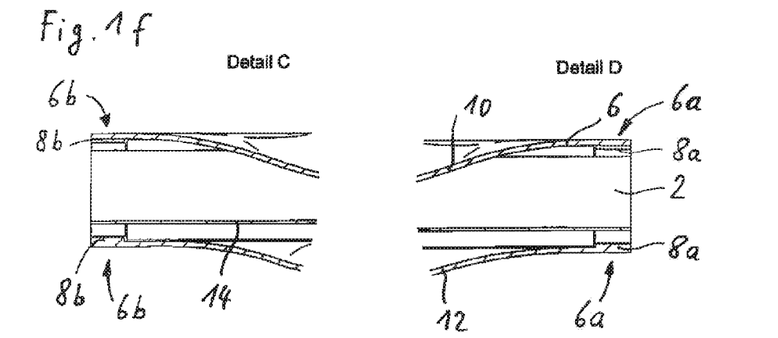
FIG. 1f shows details from FIG. 1d, and FIGS. 1g, h show two perspective views.
Figure 1G:
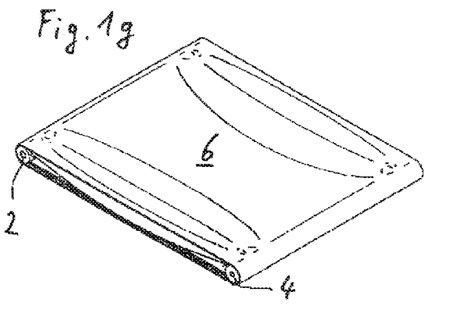
Figure 1H:
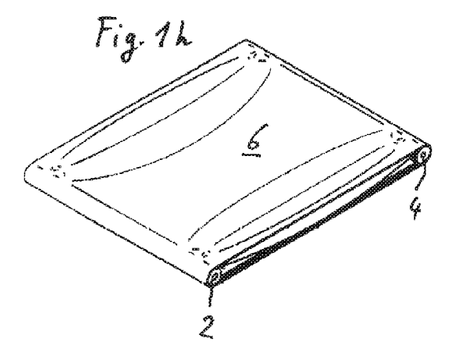
Figure 1I:
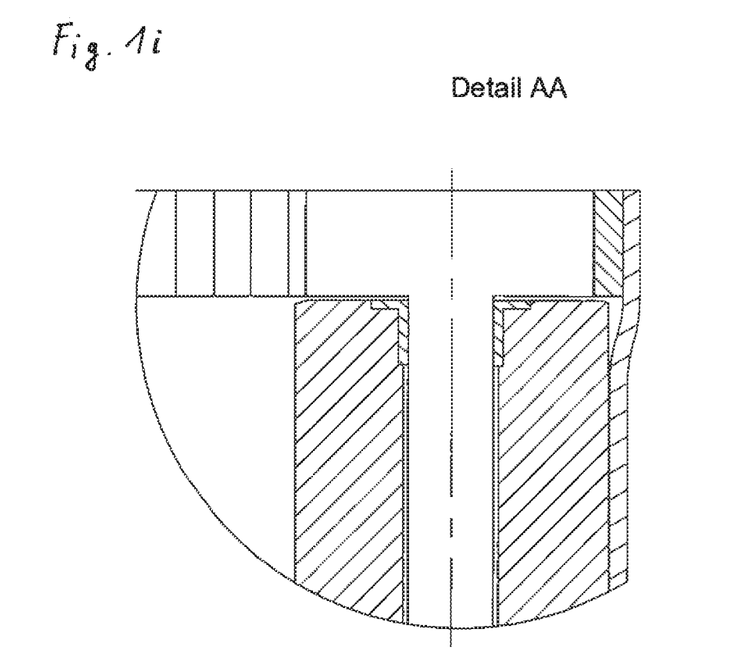
FIG. 1i shows an enlarged excerpt from FIG. 1a, in which an edge and return region of the load-bearing means is illustrated in cross-section.

FIG. 1i explains this with reference to an enlarged illustration of an end portion of the drive roller 4 with the sprocket 4b. The drive roller 4 has a central shaft 5, on the ends of which the sprockets 4b are non-rotatably mounted. Between the sprockets 4b, a core 7 with an outer diameter d is rotatably mounted on the shaft 5. The sprockets 4b and the circulating toothed belt 8a, b engaging with them are configured such that an outer reversing drum diameter D of the toothed belt 8a, b on the sprockets 4b is greater than d. As a result, the longitudinal edges 6a, 6b of the conveyor belt are stretched more than the middle portion of the conveyor belt 6 located between them, which turns on the core 7. The result of this in turn is that even when there is no load, a trough shape forms in the conveyor belt.

As explained, the middle portion of the conveyor belt, which is located between the toothed belt 8a, b, is guided around the drive and return rollers 2, 4 with or without less bias than the longitudinal edges 8a, 6b, which applies equally to a carrying run 10 and a lower run 12 of the conveyor belt 6, as is illustrated in FIGS. 1c and 1f. In particular, it can clearly be seen that there is no or comparatively little sag in the toothed belt 8a, b and the longitudinal edges 6a, b associated with it, and that there is a comparatively great, trough-like sag in the portion of the conveyor belt 6 located between them, seen both in the conveying direction 13 to the adjacent return and drive rollers 2, 4 and looking towards the toothed belt 8a, b.

In order to provide the conveyor belt 6 with defined support under load and to prevent excessive sag, a support means is disposed beneath the carrying run 10, between the upper and lower runs 10, 12, in the form of a sliding plate 14, which is configured to be concave towards the carrying run 10. The sliding plate 14 is curved one-dimensionally in the embodiment illustrated. It is flat when seen transversely to the conveying direction 13, or in a direction parallel to the axes of rotation 2a, 4a of the return and drive rollers 2, 4, and curved when seen in the conveying direction 13. FIG. 1f shows the straight shape of the sliding plate 14 in a direction transverse to the conveying direction 13.

In FIG. 5, the shape of the conveyor belt 6 under the load imposed by a load item 16 resting on the conveyor belt is illustrated for the embodiment according to FIG. 1. As FIG. 5b shows, even in this case of a load imposed, the longitudinal edges 6a, b with the toothed belt 8a, b of the conveyor belt 6 exhibit virtually no sag, whereas the conveyor belt 6 is pressed down in a middle portion, where the load item 16 is resting, as far as the sliding plate 14, as FIG. 5d also shows, in which a section in the region of an end face of the load item 16 is illustrated in a plane perpendicular to the conveying direction 13.

Figure 5A:
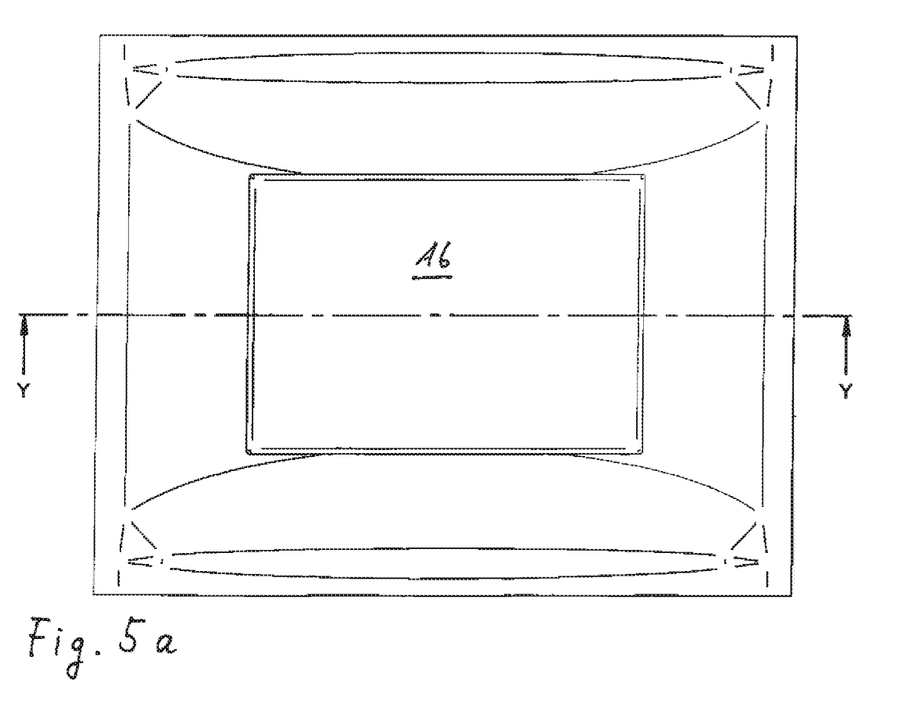
Figure 5B:
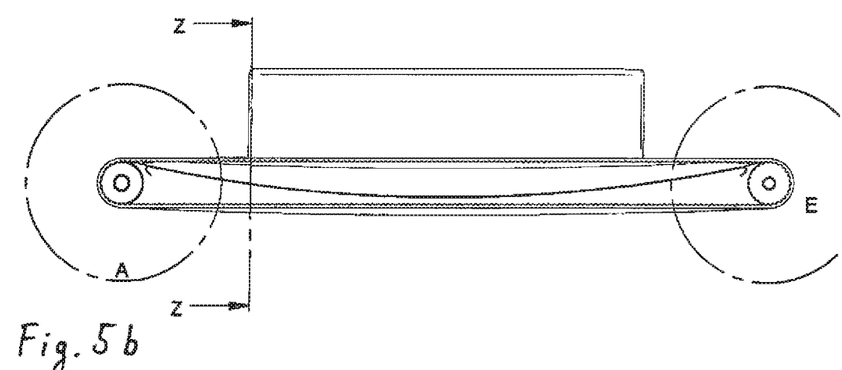
Figure 5C:
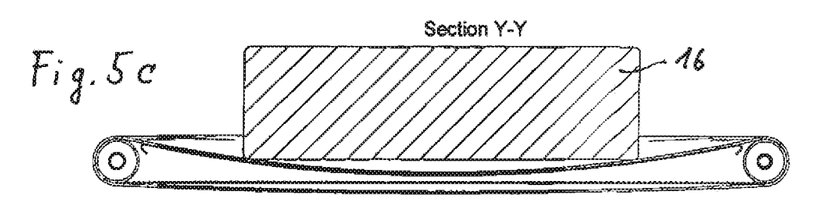
Figure 5D:
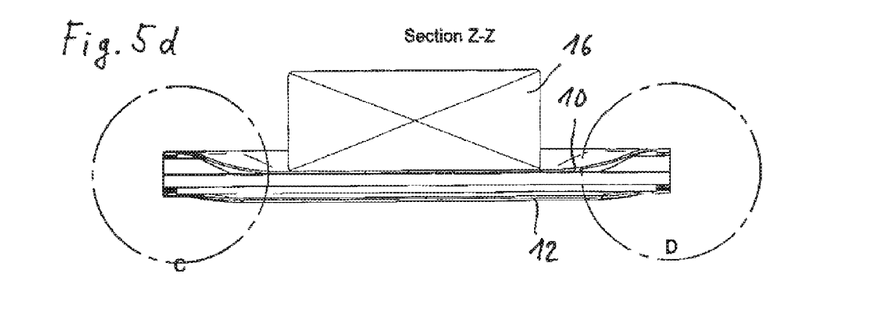
FIG. 5 shows the embodiment according to FIG. 1 in an unloaded state, with FIGS. 5a-h showing corresponding views to those in FIGS. 1a-h.
Figure 5E:
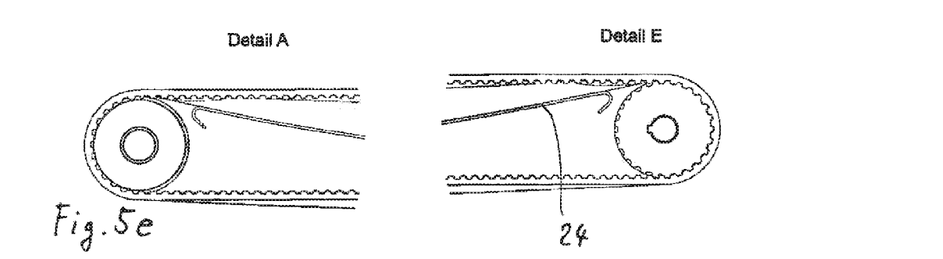
Figure 5F:
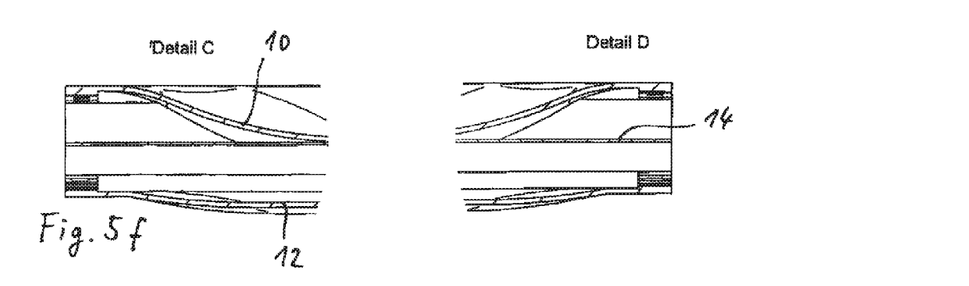
Figure 5G:
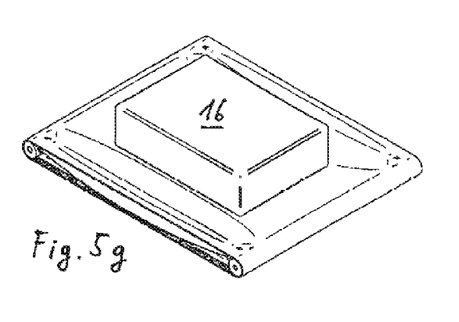
Figure 5H:
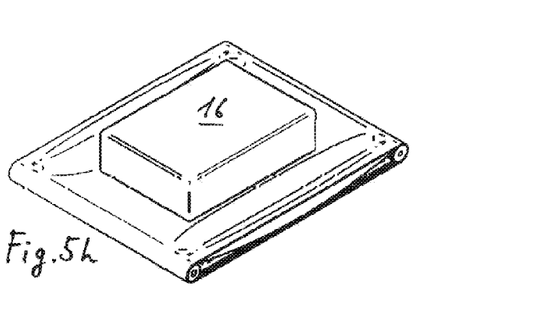

FIG. 5f differs from FIG. 1f in that it shows that the sag of the lower run 12 has been reduced because of the load weighing on the carrying run 10, which can also be seen from FIGS. 5b, c and d.

Figure 2A:
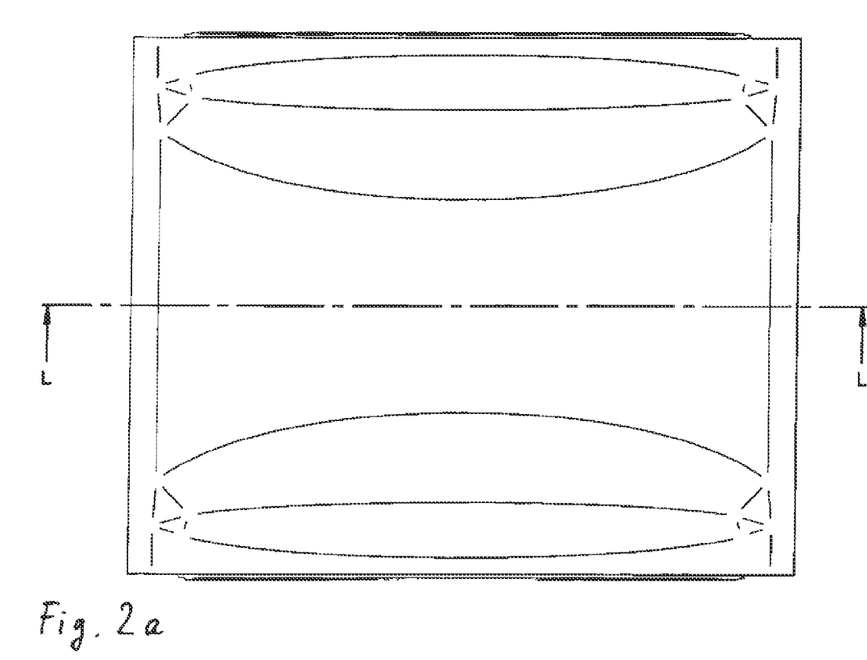
Figure 2B:
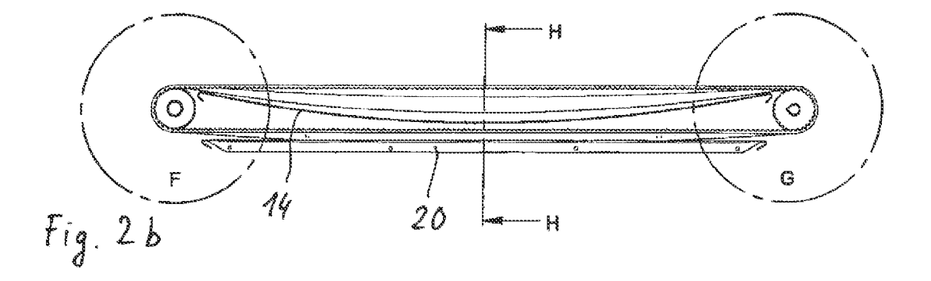
Figure 2C:
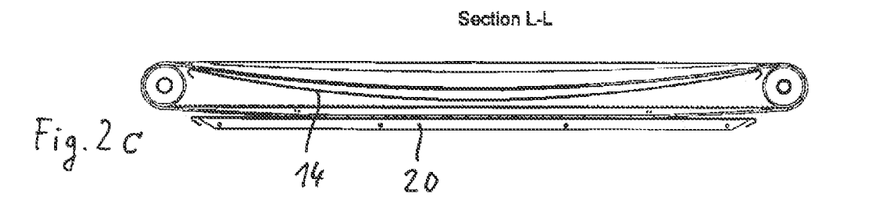
Figure 2D:
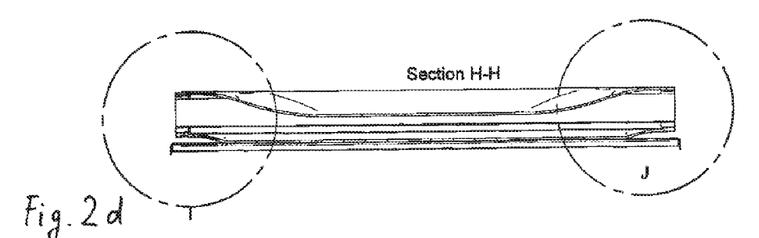
Figure 2E:
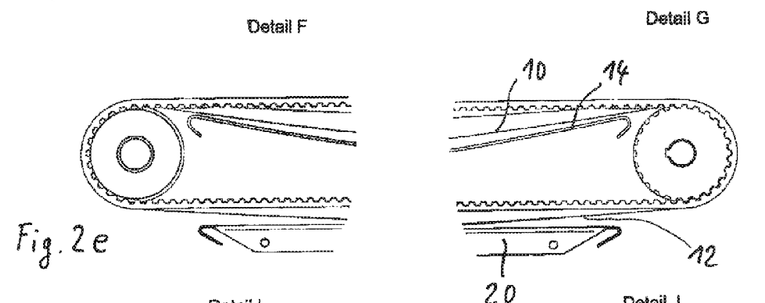
Figure 2F:
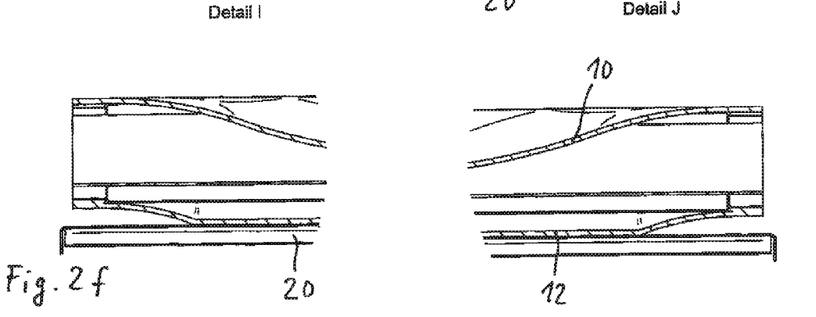
Figure 2G:
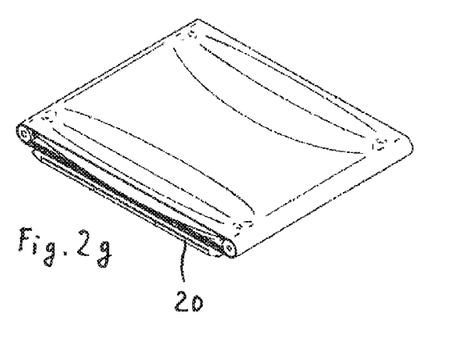
Figure 2H:
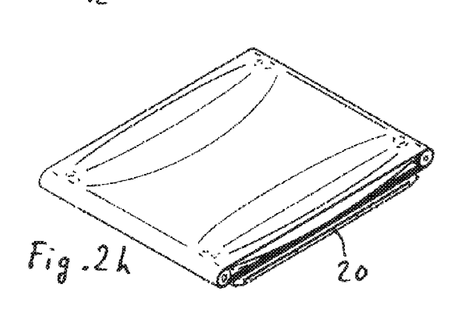
Figure 3A:
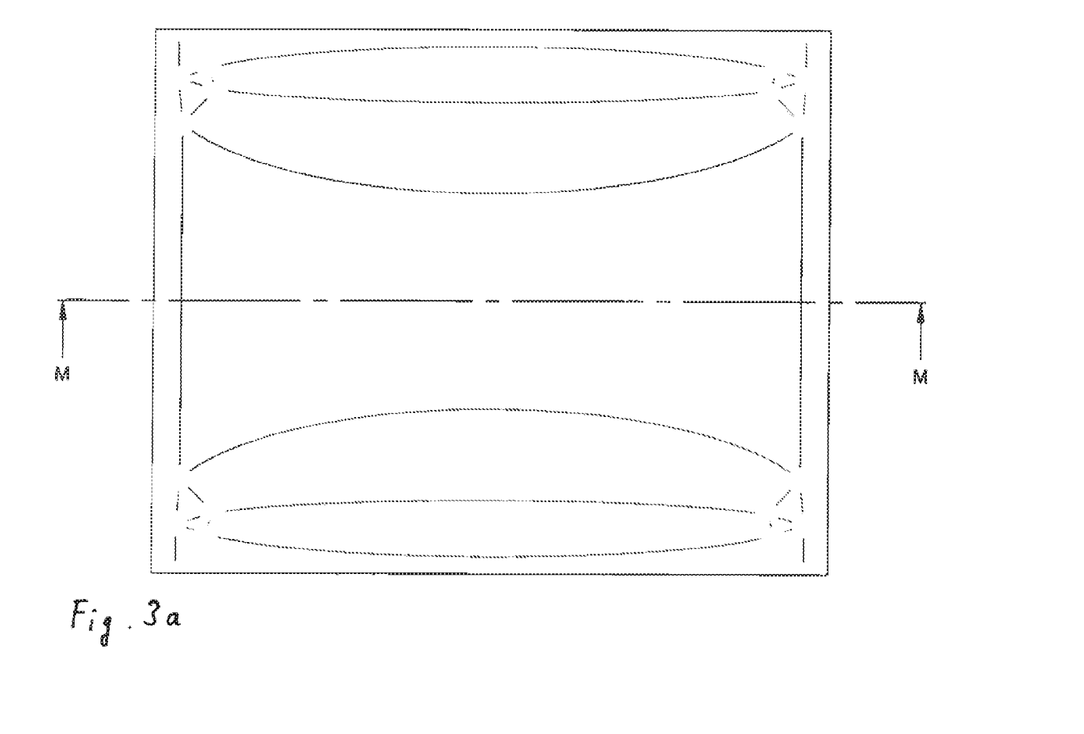
Figure 3B:
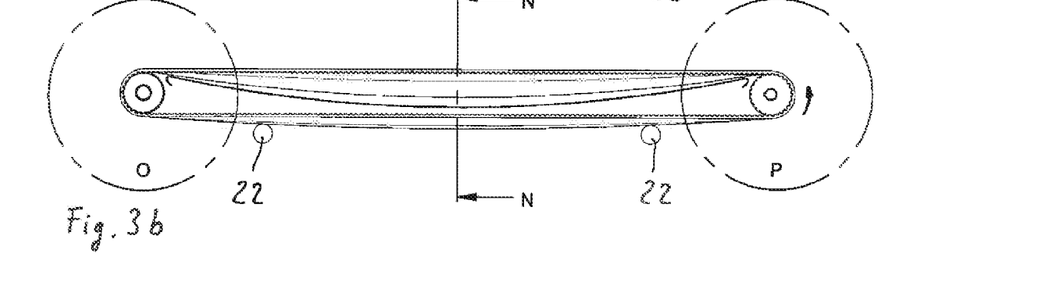
Figure 3C:
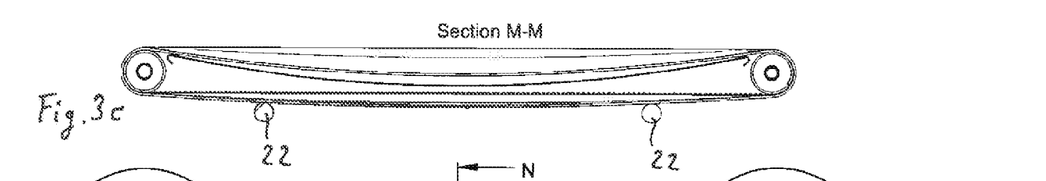
Figure 3D:
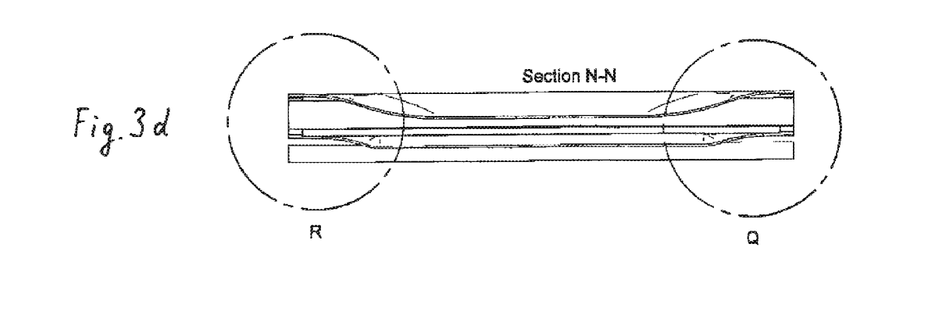
Figure 3E:
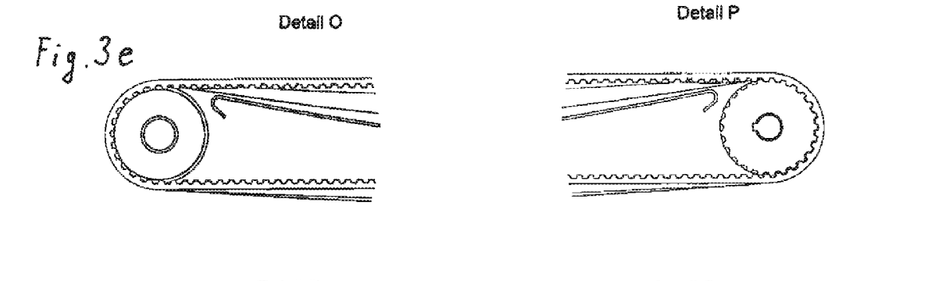
Figure 3F:
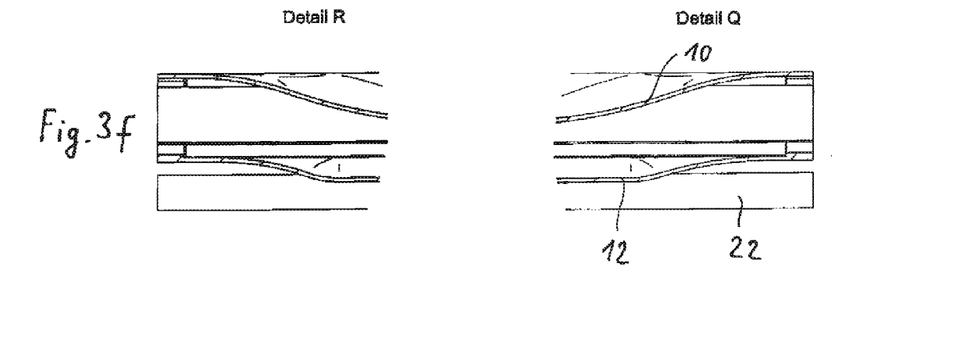
Figure 3G:
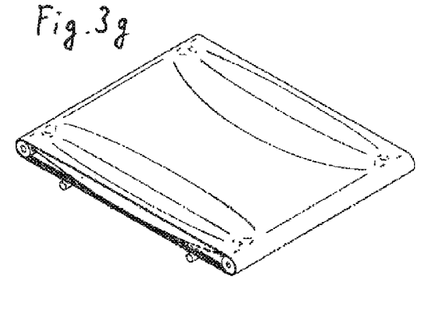
Figure 3H:
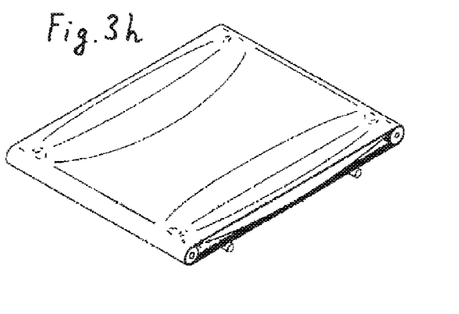

Since a sag of the carrying run 10 can be lightened or increased by reducing or eliminating a sag of the lower run 12, it can be advantageous to provide a lower support means to support the lower run in order in this way to limit or completely to eliminate a sag of the lower run. FIG. 2 shows an embodiment similar to FIG. 1, in which a lower support means 20 is provided in the form of a sliding plate. Unlike the support means for the carrying run in the form of the sliding plate 14, the lower support means 20 is not concave in shape, but flat. The resulting shape of the lower run 12, portions of which rest on the lower support means 20, is illustrated in FIGS. 2b, c and d and, enlarged, in FIG. 2f.

FIG. 3 shows a variant in which the lower support means 20 is not formed by a sliding plate, but rather by one or more supporting rollers 22, whose axes of rotation are parallel to those of the return and drive rollers 2, 4.

Figure 4A:
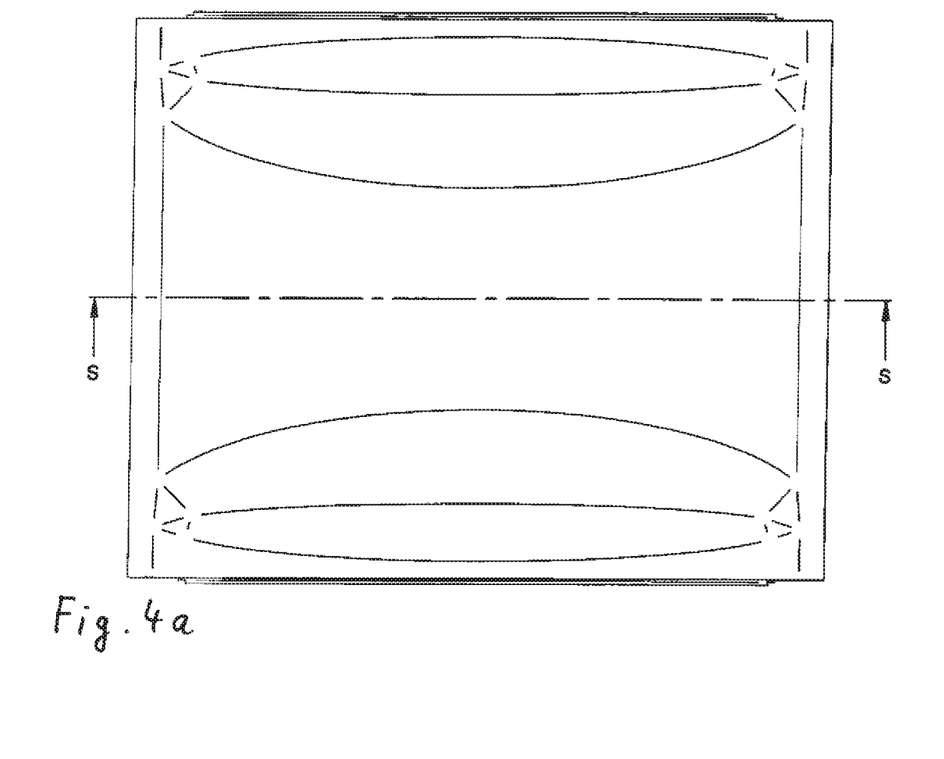
Figure 4B:
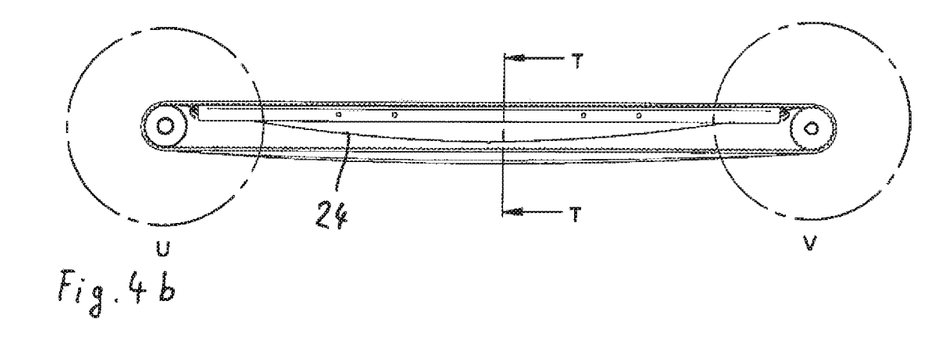
Figure 4C:
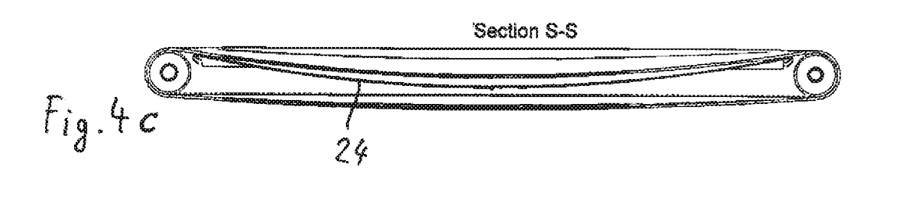
Figure 4D:
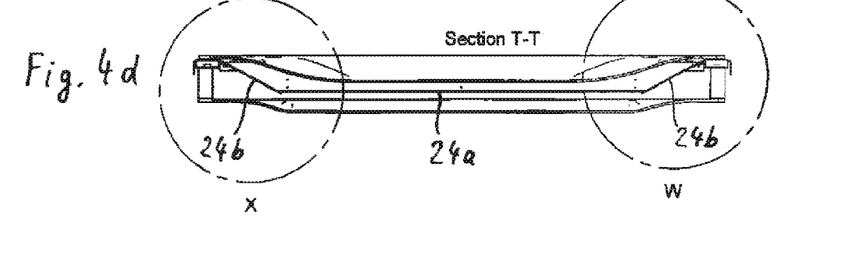
FIG. 4 shows a fourth embodiment, with FIGS. 4a-h showing corresponding views to those in FIGS. 1a-h.
Figure 4E:
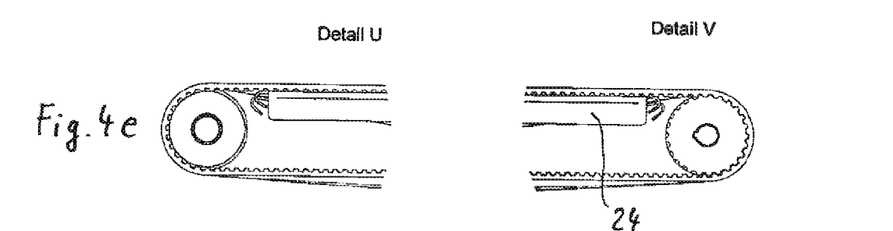
Figure 4F:
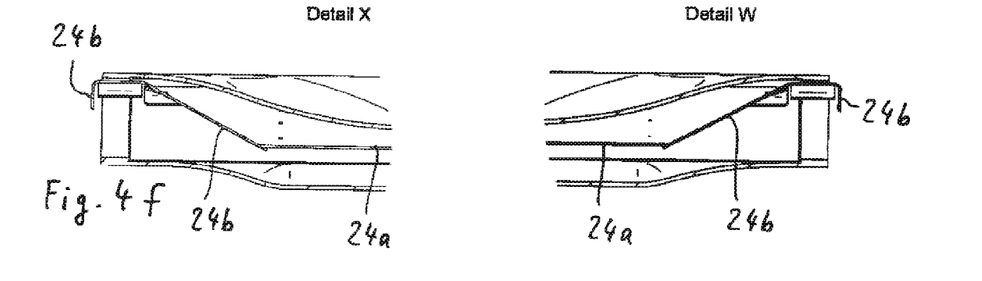
Figure 4G:
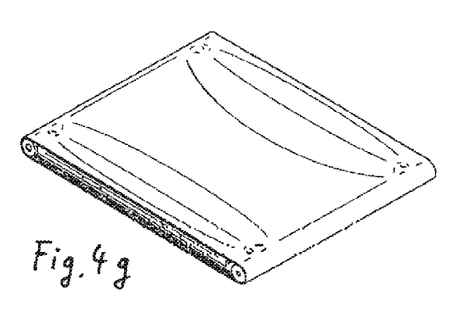
Figure 4H:
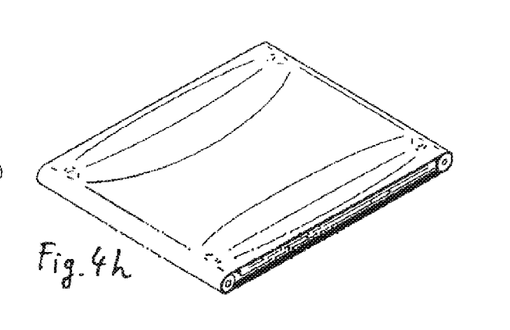

FIG. 4 shows a variant in which the support means is formed in the shape of a troughed sliding plate 24 forming a two-dimensional concavity, having a middle portion 24a with a shape corresponding to the sliding plate 14 according to FIG. 1, which is curved one-dimensionally, with lateral portions 24b adjoining the middle portion 24a rising in a trough-like shape to the longitudinal edges 6a, b of the conveyor belt 6, which may run to immediately beneath the toothed belt 8a, b, as is illustrated in FIGS. 4d and 4f. In this embodiment too, a lower support means in accordance with FIG. 2 or 3 may be provided.

The support means 14 may alternatively be formed by concave strips of rollers or concavely configured roller tracks. The same applies to the troughed sliding plate 24, in which the middle portion and/or the lateral portions may be formed by strips of rollers or roller tracks.

Figure 6A:
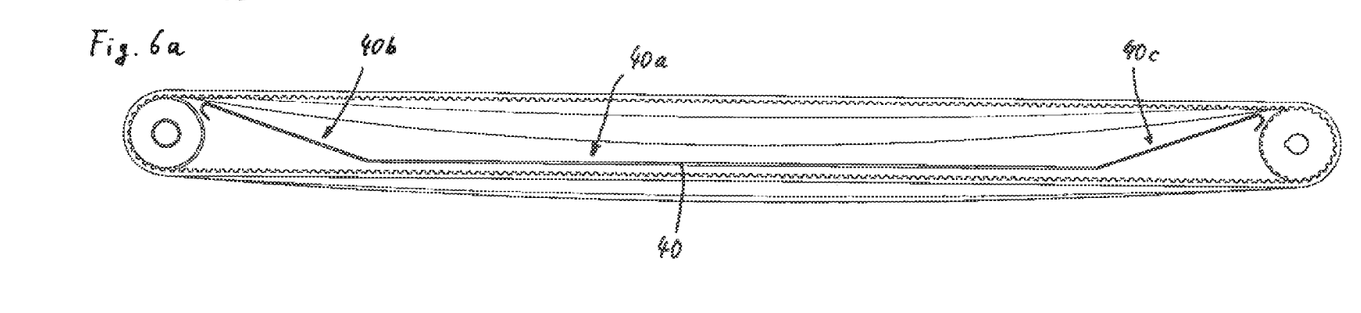
FIG. 6a shows a fifth embodiment.

FIG. 6a shows an embodiment in which a support means in the form of an intermediate plate 40, regions of which are flat, prevents contact between the carrying run and the lower run and at the same time prevents excessive sag of the carrying run. The intermediate plate 40 forming the support means consists of a flat middle portion 40a and two portions 40b, 40c folded back away from it, which are likewise flat and extend as far as the return and drive rollers 2, 4. The folded-back portions 40b, c extend from just below the carrying run to just above the lower run, where they pass over into the middle portion 40a. Seen in the conveying direction 13, the middle portion 40a is greater in length than the folded-back portions 40b, c and can occupy 50%, 60%, 70% or 80% of the distance between the axes of the return and drive rollers 2, 4.

Figure 6B:
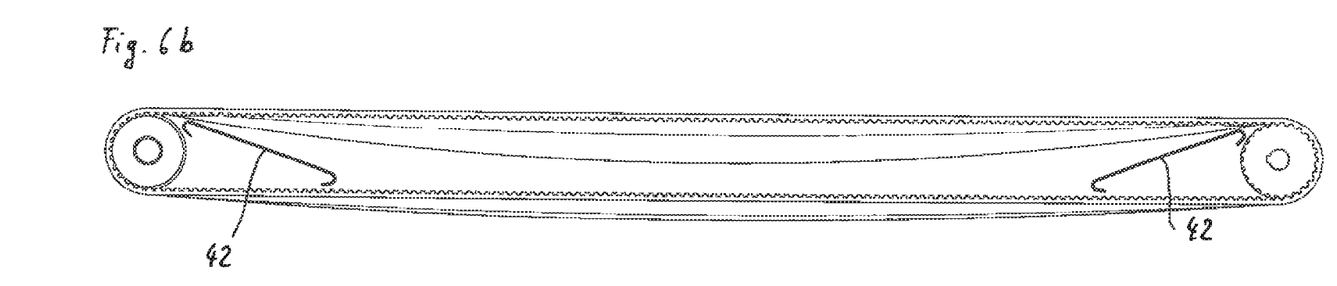
FIGS. 6b-d show a sixth embodiment.
Figure 6C:
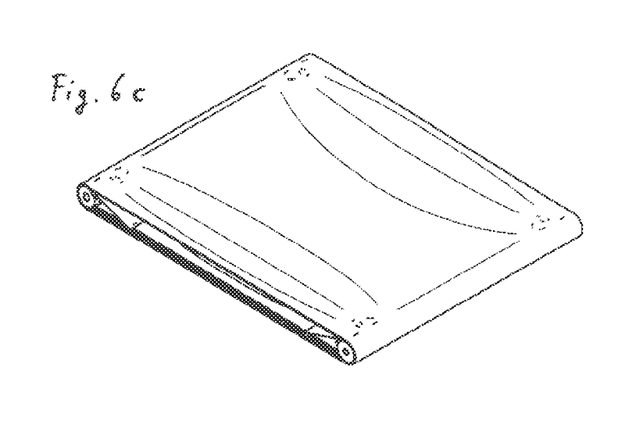
Figure 6D:
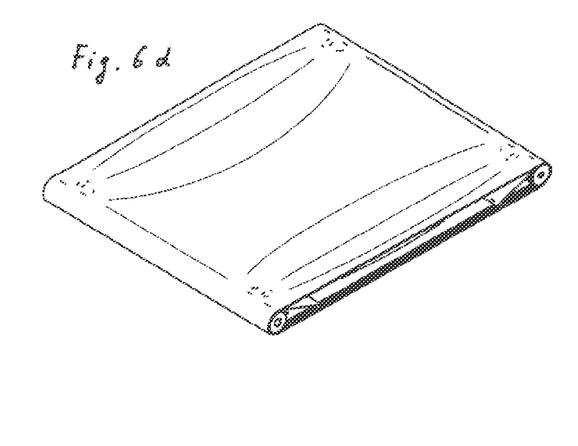
Figure 7A:
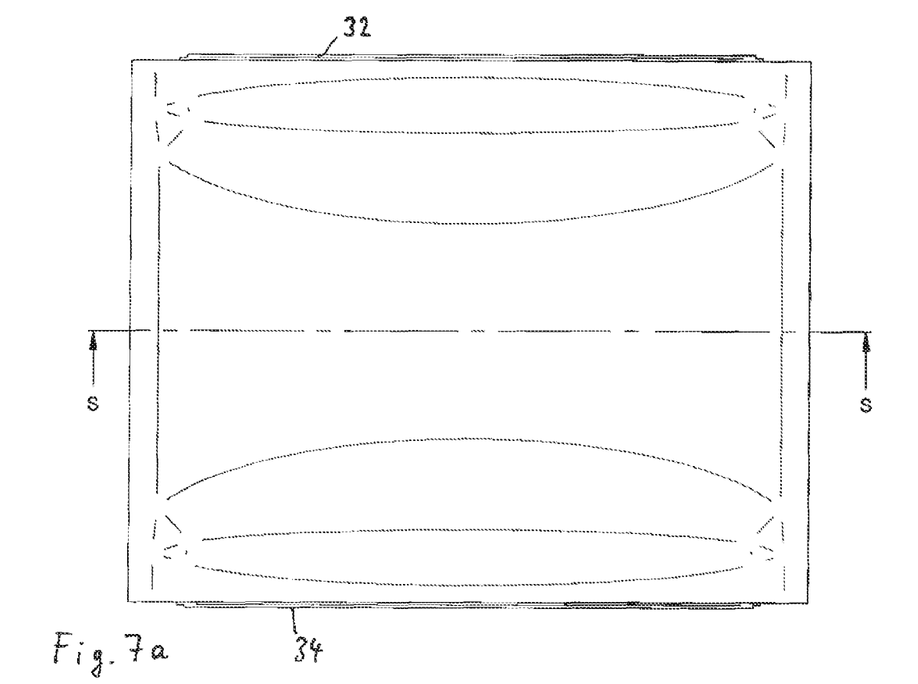
Figure 7B:
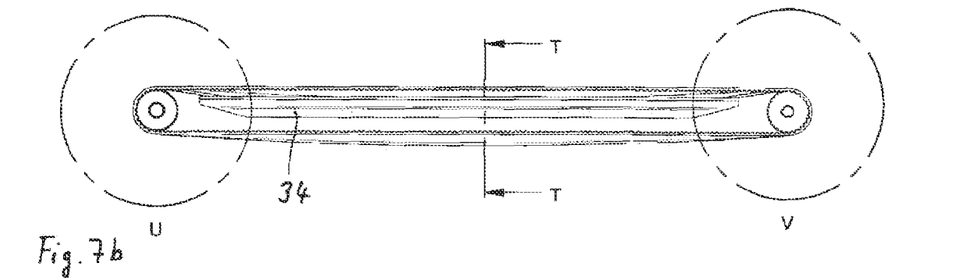
Figure 7C:
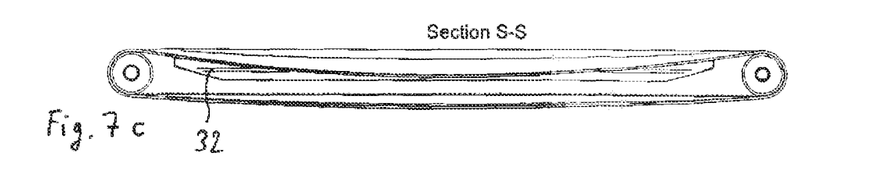
Figure 7D:
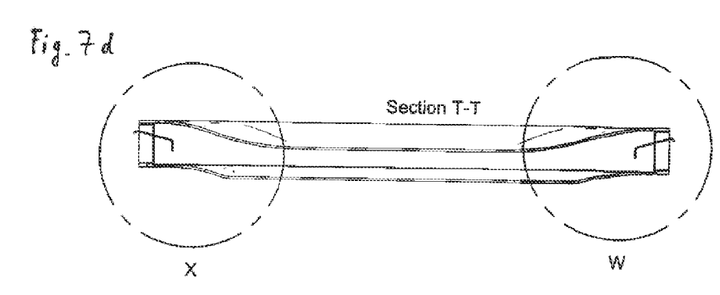
Figure 7E:
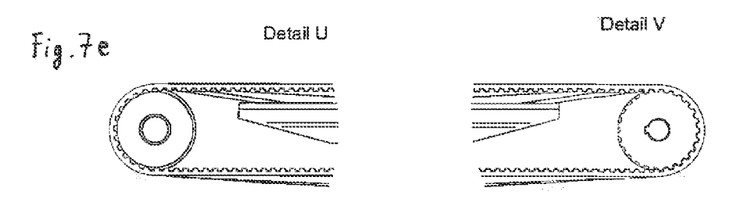
Figure 7F:
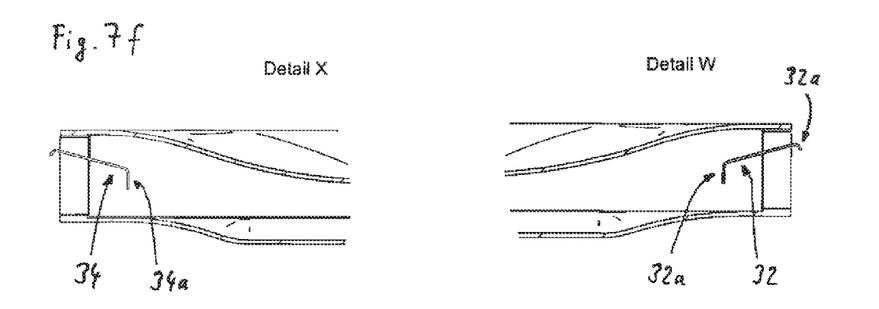
Figure 7G:
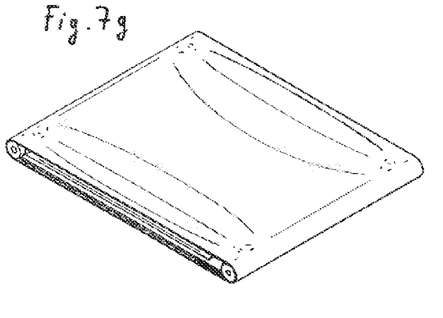
Figure 7H:
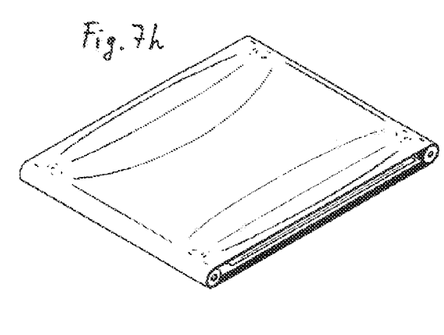

FIGS. 6b, c and d show a further embodiment, in which the support means is merely located in the vicinity of the drive and return rollers 2, 4 and corresponds in the example illustrated to the folded-back portions 40b, c of the embodiment according to FIG. 6a, without the middle portion 40a. In this embodiment, the support means thus consists of two mutually opposing support parts 42, which extend from the drive and return rollers 2,4 and are relatively short in length, seen in the conveying direction, for example 10%, 20% or 30% of a mutual distance between the axes of rotation of the drive and return rollers 2, 4 in each case. The support parts 42 extend from the drive or return roller from the carrying run to the lower run of the conveyor belt 6 in a downwardly inclining direction.

FIG. 7 shows an embodiment in which the load imposed on the load-bearing means, or the conveyor belt, is only supposed to be reduced in the region of the drive trains when a heavy load item is placed on the conveyor belt. For this purpose, the support means is not formed continuously transversely to the conveying direction 13, but instead has supporting edge portions 32, 34 which are disposed beneath and spaced apart from the drive trains and are inclined transversely to the conveying direction, dropping towards the middle. When the conveyor belt is subjected to the load of a load item placed on it centrally, since the conveyor belt in its longitudinal edge portions and hence also the drive trains take on a transverse inclination, so that they slope towards each other, a large area of the drive trains tends to rest on the supporting edge portions 32, 34, which have a similar transverse inclination, thus achieving a good supporting effect.

In the embodiment illustrated, the supporting edge portions 32, 34 are flat and are provided with lateral folds 32a, 34a as reinforcements. In other embodiments, the supporting edge portions could have a curvature when seen in the conveying direction, rather like the case with the sliding plate illustrated in FIG. 1, and/or a curvature seen transversely to the conveying direction.

LIST OF REFERENCE NUMERALS 2 return roller
2a axis of rotation
4 drive roller
4a axis of rotation
4b sprocket
5 shaft
6 conveyor belt (load-bearing means)
6a, b longitudinal edge
7 core
8a, b toothed belt (drive train)
10 carrying run
12 lower run
13 conveying direction
14 sliding plate (support means)
16 load item
20 lower support means
22 supporting roller
24 troughed sliding plate
24a middle portion
24b lateral portion
28, 30 supporting region
32, 34 supporting edge region
32a, 34a lateral fold
40 intermediate plate
40a middle portion
40b, 40c folded back portion
42 support part
d diameter (of 7)
D diameter (of 8a, b on 4b)
L axial length (of 2, 4)

The invention claimed is:

1. A conveyor means with an elastic load-bearing means guided between a drive and a return roller which are spaced apart parallel to and opposite one another, wherein said load-bearing means circulates endlessly in a carrying run and a lower run, is flexible in all directions and is configured to receive articles to be conveyed, and which can be driven in a conveying direction by means of drive trains disposed on longitudinal edges of said load-bearing means, characterised in that a support means for the carrying run is located between the carrying run and the lower run, wherein the drive trains are stretched to a greater extent than a region of the load-bearing means located between them.

2. The conveyor means as claimed in claim 1, characterised in that the support means is given a concave shape when seen in the direction of the carrying run.

3. The conveyor means as claimed in claim 1, characterised in that the support means is curved one-dimensionally and has a linear or flat deepest region between and parallel to the drive and return rollers.

4. The conveyor means as claimed in claim 1, characterised in that the support means is curved two-dimensionally and has a deepest region over a certain area or at a point between the drive and return rollers and between the longitudinal edges of the load-bearing means.

5. The conveyor means as claimed in claim 1, characterised in that the support means has one or two supporting region(s) adjacent to one or both drive and return roller(s).

6. The conveyor means as claimed in claim 1, characterised in that the support means has one or two supporting edge region(s) adjacent to one or both longitudinal edges of the load-bearing means.

7. The conveyor means as claimed in claim 1, characterised in that, in the unloaded state, the load-bearing means does not touch the support means.

8. The conveyor means as claimed in claim 1, characterised in that, in the unloaded state, some regions of the load-bearing means rest on the support means.

9. The conveyor means as claimed in claim 1, characterised in that when the load-bearing means is in an unloaded state, the drive trains are guided between the drive and return rollers with a predetermined or adjustable biasing force.

10. The conveyor means as claimed in claim 1, characterised in that a lower support means is disposed beneath the lower run of the load-bearing means in order to limit or eliminate the sag of the lower run.

11. The conveyor means as claimed in claim 1, characterised in that the drive trains are toothed belts fixed on the inside to the longitudinal edges of the load-bearing means.

12. The conveyor means as claimed in claim 1, characterised in that the load-bearing means has a greater deflection radius on at least one of the drive and return rollers in the region of the drive trains than in a region located between them.

13. The conveyor means as claimed in claim 1, characterised in that the drive and return rollers have a plurality of zones of different diameters along their axial length, through which zones with different degrees of stretching are formed in the load-bearing means.

14. A vehicle with a conveyor means as claimed in claim 1, wherein a conveying direction of the conveyor means is transverse to a direction of travel of the vehicle, especially configured as a car of a load item conveyor which is connected mechanically or in a controlled manner to further vehicles of the same kind and is rail-mounted or is configured as a driverless transport system.

* * * * *